United States Patent [19]

Hanson et al.

[11] 3,839,907

[45] Oct. 8, 1974

[54] ENGINE PERFORMANCE ANALYZER USING SIMULATED LOAD

[75] Inventors: Richard Eric Hanson, Woburn; Howard Eisen Fineman, Newton Centre, both of Mass.

[73] Assignee: RCA Corporation, New York, N.Y.

[22] Filed: Mar. 30, 1973

[21] Appl. No.: 346,671

[52] U.S. Cl. ................................................ 73/116
[51] Int. Cl. ......................................... G01m 15/00
[58] Field of Search ............. 73/116, 117.3; 324/19

[56] References Cited
UNITED STATES PATENTS
3,650,149   3/1972   Howes ............................. 73/117.3

Primary Examiner—Jerry W. Myracle
Attorney, Agent, or Firm—Edward J. Norton; Carl V. Olson

[57] ABSTRACT

A simulated load is applied to an internal combustion engine while testing apparatus analyzes the overall performance of the engine. The simulated load is effected by periodically interrupting the engine ignition to reduce the total developed power of the engine to a value equal to its frictional horse power at the resulting engine speed. The firing ratio of the interruption cycle is preset to a fixed value to allow engine operation under full throttle conditions within acceptable engine speed limits. The difference between the resulting speed and a predetermined test speed provides a criterion for the overall performance evaluation of the internal combustion engine.

6 Claims, 5 Drawing Figures

1

ENGINE PERFORMANCE ANALYZER USING SIMULATED LOAD

The invention herein described was made in the course of or under a contract or subcontract thereunder with the Department of the Army.

BACKGROUND OF THE INVENTION

In the course of testing an internal combustion engine, it is common to inhibit the ignition of one or more cylinders in order to determine the contribution of such cylinder or cylinders to the total performance of the engine. An analysis of the resulting engine performance, e.g. variations in engine speed as obtained from a tachometer, reflects either individually, or as compared to other cylinders, mechanical operating conditions within the cylinders. However, these tests are normally conducted at a relatively low throttle setting such as at idle or fast idle conditions on an unloaded engine. An attempted extension of these techniques to nondestructive full throttle engine operation presents operational problems or hazards for both the vehicle and the mechanic.

Moreover, meaningful operational and diagnostic testing of the overall performance of internal combustion engines requires that tests include operation at or nearly at full fuel and air flow conditions, thereby exercising fuel and air intake systems at full capacity. Further, combustion chamber pressures must reach the relatively high, full-load or peak value in order for the presence of a malfunction to be more readily detected. Accordingly, to permit performance testing under these conditions a load must be applied to the engine under test. If, however, the amount of fuel or air-fuel mixture delivered to an internal combustion engine, operating without a load, is increased beyond that required for maximum speed, the engine will overspeed. Further, if an engine is allowed to accelerate until it overspeeds, mechanical damage may result for the reason that the centrifugal and inertial forces on the moving parts exceed their designed values in this forbidden mode of operation. Moreover, an unloaded engine will overspeed long before the maximum fuel and air flow values are reached.

In the copending applications of Richard T. Cowley and Leonard R. Hulls, Ser. No. 187,068, now U.S. Pat. No. 3,757,570 and George A. Chamberas, Ser. No. 187,069, now U.S. Pat. No. 3,757,571 both filed on Oct. 6, 1971, and assigned to the same assignee as the present invention, there are disclosed methods and apparatus for providing a simulated load for internal combustion engines. In the present invention, the internal combustion engine is loaded in accordance with the teachings of the above-identified copending applications, making use of appropriate control interlocks to produce a simple operational test which protects the vehicle engine from possible inadvertent overspeed conditions, while associated apparatus analyzes the performance of the engine.

SUMMARY OF THE INVENTION

The present invention provides an engine performance analyzer and load simulator for internal combustion engines of the type having a throttle which normally controls the speed of the engine between minimum and maximum speed values and having an ignition system which normally provides ignition periods at a rate related to the speed of the engine. The analyzer comprises means coupled to the ignition system or inhibiting the occurrence of ignition during a predetermined proportion of successively occurring ignition periods to provide a simulated load to said engine equivalent to a given actual load corresponding to given throttle setting of the resulting engine speed, between the minimum and maximum speed values, without applying an external load. The predetermined proportion of successively occurring ignition periods is selected to ostensibly provide a resulting nominal speed which is determined by the normal operating characteristics of the engine. Means are provided for detecting the actual speed of the engine which results from inhibiting the occurrence of the ignition during the predetermined proportion of the successively occurring ignition periods. Means coupled to the detecting means compare the detected actual speed of the engine to a reference speed related to the nominal speed to provide an output corresponding to the departure of the actual speed from the reference speed. Indicating means responsive to the output of the comparing means are provided for indicating the disparity between the actual speed and the reference speed.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

The available output power or brake horsepower (BHP) of an internal combustion engine is equal to the indicated horsepower (IHP) minus the friction horsepower (FHP). The IHP represents the total developed power in the cylinders of the engine. The FHP represents the internal losses of the engine and is attributable to four factors: (1) friction loss in bearings, rings, pistons and valve gear; (2) compression of air and fuel mixtures prior to combustion; (3) pumping power required to deliver the air and fuel into the cylinders; and (4) engine auxiliaries which require power such as the cooling fan, water pump, fuel pump and generator.

The IHP, as well as the BHP, of an internal combustion engine is generally increased by increasing the engine speed. The speed of the engine is ordinarily increased by advancing the throttle to increase the fuel flow. In response to an advance of the throttle setting, the engine speed will increase until a steady-state condition is reached. The engine speed at a particular throttle setting will reach a steady-state value when the IHP equals the sum of the FHP and the power dissipated in the load. In other words, assuming that the load remains constant, the increasing IHP, and therefore BHP, results in an increasing engine speed up to a value where the increased FHP offsets the increased IHP.

Figure 1:
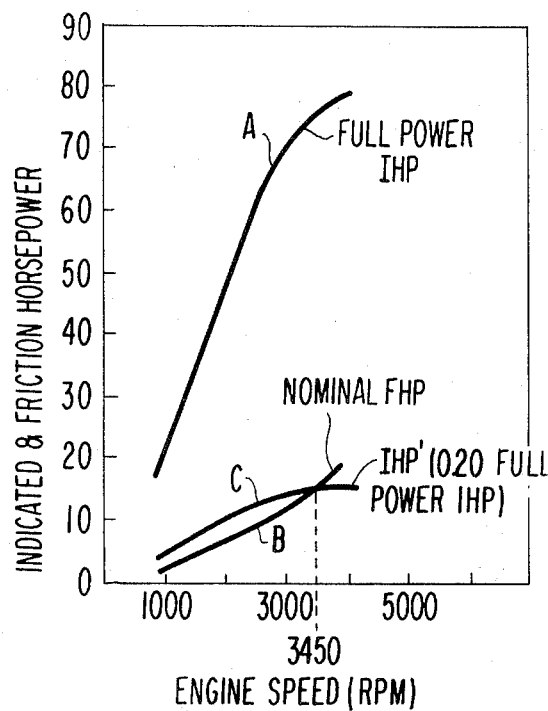
FIG. 1 is a graphic representation illustrating the relationship of horsepower over the speed range of a typical internal combustion engine.

Referring now to FIG. 1, there is shown a graph of curves plotted to show the indicated and friction horsepower over the speed (R.P.M.) range of a typical four cylinder internal combustion engine. The data for the curves were obtained by motoring a U.S. Military L141 spark ignition engine for an M151 ¼ ton truck. The full power IHP is represented by curve A and curve B represents the FHP. The full power BHP (not shown) is equal to the difference between curves A and B, or full power IHP-FHP. Curve C illustrates a theoretical IHP' curve which is equal to one-fifth (or 20 percent) of curve A along the entire operating range.

A study of the curves of FIG. 1, shows that if the IHP of an unloaded engine is adjusted to a value equal to the FHP at a particular speed setting, a steady-state condition will result at that speed setting. Under these circumstances the BHP (which is equal to IHP-FHP) is reduced to zero value and the reduced IHP just offsets the FHP. It is noted that when the BHP is reduced to zero, the available output power of the engine is zero and the total developed power in the cylinders is dissipated by the internal losses or FHP of the engine. Thus, by adjusting the IHP of an engine to a value equal to its FHP at a particular speed setting, the engine can be operated without an external load and at any corresponding throttle setting including wide-open-throttle. Similarly, the speed on an unloaded engine can be controlled at any speed setting below the maximum speed rating at which it would normally run under loaded conditions for a particular throttle setting.

Curve C of FIG. 1 represents the resulting total developed power IHP' in the cylinders when the IHP is reduced to one-fifth or 20 percent of its normal operating level over the entire speed range. It can be seen that curve C intersects the FHP curve at approximately 3,450 R.P.M. The intersection of these curves represents the steady-state speed value that is achieved when the IHP is reduced to one-fifth or 20 percent of its full power operating level. In a similar manner, if the IHP were reduced to some other percentage of its normal operating level, the engine would reach a steady-state condition at that speed where a curve representing that percentage of IHP intersected the FHP curve. It is noted that the IHP, of the L141 engine represented in FIG. 1, must be reduced to a value less than that contributed by one of its four cylinders in order to reach a steady-state condition which is below the maximum operating speed of the engine.

In the present invention the IHP of an engine under test is reduced to ostensibly establish a nominal steady-state value or to be equal to the FHP at a nominal speed by interrupting the ignition system such that the cylinders are fired at a rate which is just sufficient to overcome the FHP losses at the desired speed. In effect, during their inoperative cycles, the cylinders act as an external load contributing to the FHP without contributing to the overall IHP of the engine. The IHP is preferably reduced by periodically interrupting the ignition in a predetermined ignition-on to ignition-off ratio.

In the prior art, the engine power producing capability of an engine under test has been tested by loading the engine, at a given throttle setting and engine speed combination, by means of a dynamometer. The resulting power output data is then a function of the available BHP and is used in comparison with similar data for known good engine under the same test conditions. Since engine power data curves are conventionally provided in terms of full-power output at full- or wide-open throttle, power producing capability tests using a dynamometer, correspondingly, are normally conducted at full-throttle. In the present invention, however, the same full-throttle curves may be used to test the engine under full-throttle conditions without necessitating the use of an external load or dynamometer. That is, in accordance with the present invention, the BHP is zero, therefore, this otherwise independent variable is a constant and, further, no calibrated external load is required. Accordingly, by holding three of four independent variables constant (i.e., the throttle position fixed at full-throttle; the available BHP a constant equal to zero; and interrupting the ignition in a predetermined, fixed ignition-on to ignition-off ratio) the fourth remaining independent variable is engine condition; and therefore, the resulting engine speed is dependent solely upon the engine condition. Thus, under these conditions, the engine condition or performance can be evaluated from the resulting speed alone.

The nominal steady-state speed is determined by and represents the typical steady-state operation point that would otherwise obtain for an engine operating at nominal or normal (specified) conditions. The nominal steady-state speed characteristics of a particular class of engines may be obtained by motoring a representative engine whose proper performance has been established. Alternatively, a number of engines may be motored in order to obtain a statistically averaged nominal figure. Accordingly, the variation between the nominal steady-state speed and the actual speed of the engine under test provides an indication of the available output power of the engine relative to a known nominal value.

The ultimate utility of this steady-state operating speed as an indication of available engine power for performance testing of a numerically large class of vehicles, is bottomed on the premise that the variation of FHP, from one vehicle to another within a particular class, is sufficiently small to permit consistent test results. This premise is substantially confirmed by an analysis of the factors or components of the FHP of a representative engine as indicated in Table 1. The FHP components analyzed in Table 1 specifically refer to the L141 Jeep vehicle of FIG. 1, however, a similar analysis of other engine types provides comparable results.

Table 1

| Component of FHP | Typical Variations in Component | Typical Percentage of Total FHP | Weighted Variation in FHP |
| --- | --- | --- | --- |
| Engine Friction | ±15% | 35% | ±5.3% |
| Compression | ±10% | 35% | ±3.5% |
| Pumping | ± 3% | 20% | ±0.6% |
| Auxiliaries | ±15% | 10% | ±1.5% |
|  |  | 100% | ±10.9% |

It can be seen that the weighted worst case variation of FHP, of the engine depicted in Table 1, is ±10.9 percent. However, the weighted root-sum-square (RSS) variation is ±6.5 percent. It will be understood by those skilled in the art that the RSS variation provides a more realistic indication of the probable variation of FHP. That is, the RSS variation of FHP, or ±6.5 percent, has the same probability of occurrence as the individual component variations and is therefore more realistic than the worst case variation of ±10.9 percent.

Figure 2:
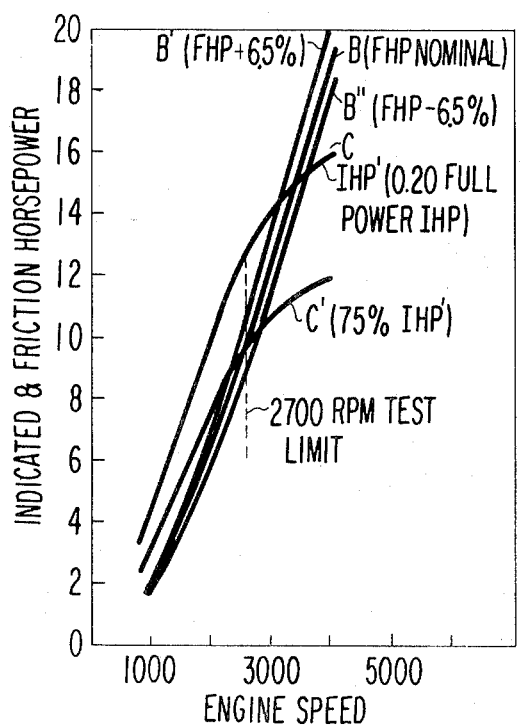
FIG. 2 is a graphic representation illustrating an expanded portion of the curves shown in the lower portion of the graph of FIG. 1.

Referring now to FIG. 2 there is shown an extension of the curves shown in the lower portion of the graph of FIG. 1. In order to show the effect of the variations listed in Table 1 more clearly, three FHP curves are shown. Curve B depicts the nominal FHP, while the nominal FHP plus 6.5 percent is indicated by curved B' and the nominal FHP minus 6.5 percent is depicted by curve B''. These three curves effectively establish the expected FHP variation which would apply to the representative engines of FIGS. 1 and 2 (L141 Jeep engine). The 20 percent of full power IHP or IHP' curve C is plotted against this FHP variation. It can be seen that the steady-state operating point for an engine developing specified power (while operating along an adjusted IHP curve equal to 20 percent of IHP, or IHP') may vary between 3,250 and 3,600 RPM. A curve C' labeled 75 percent of IHP' shows the effect on steady-state speed of an engine with a 25 percent power loss. The intersection of the 75 percent IHP' curve (C') with the three FHP curves indicates that a corresponding steady-state speed may vary from 2,460 to 2,830 RPM.

In accordance with the present invention, it should now be appreciated that by arbitrarily selecting a test or reference speed equal to the steady-state speed which would result when an engine is only providing a fixed fraction, for example 75 percent, of its nominal developed power, the performance of the engine can be determined by comparing the actual resulting speed to the test limit or reference speed. That is, the departure of the actual resulting speed from the anticipated nominal speed can be related to the departure of the actual developed power from the nominal 100 percent (or selected fraction thereof) full developed power of the engine. Further, since BHP = IHP − FHP, the speed departure may similarly be equated to the available output power of the engine. Alternatively, the actual resulting speed may be directly compared to the anticipated or nominal full power, steady-state speed. It has been found, however, that by establishing a reference speed which is a predetermined fraction of the nominal full power speed and then determining whether the resulting speed meets or exceeds the reference speed, an efficient and convenient performance analyzer can be realized.

Referring again to FIG. 2, it can be seen that the resulting steady-state speed for an engine producing only 75 percent of full power IHP, i.e., 75 percent of IHP', while being tested in accordance with the principles of the present invention, is 2,700 RPM. It can also be seen that the FHP at this speed varies between 9.4hp to 10.8hp. This variation corresponds to a low power indication or reference speed datum for developed power ranging from 72 percent of IHP to 82 percent of IHP. Accordingly, a resulting or actual steady-state speed of 2,700 RPM or greater would indicate that the engine under test is providing at least 82 percent of nominal IHP for an engine having an FHP which is 6.5 percent above nominal; and, at least 72 percent of nominal IHP for an engine having an FHP which is 6.5 percent less than the nominal FHP. For some engine performance analyzer applications, this range might indicate that the reference or test speed has been selected higher (or lower) in value than desirable; however, the selection of the reference test limits for an acceptable power loss can be selected to suit the needs of a particular application.

It has been found that the most effective engine performance analyzer using a simulated load in accordance with the present invention, requires detailed consideration of the user. For example, the analyzer must be designed for ease of operation not only to encourage and promote its use by an average, or reluctant mechanic; but, also to avoid damaging an engine as the ignition interrupt technique which provides the requisite simulated load, can also provide opportunities for either stalling the engine or, more significantly, operating beyond the maximum or "red-line" speed. These considerations have dictated that a number of interlocks be incorporated into the analyzer to protect the engine and to simplify its use by the mechanic or operator. In a preferred form of the present invention, as will be described more fully with reference to FIG. 3, the operator need only press a single test button and to subsequently operate the engine at wide-open-throttle. Accordingly, speed evaluation and fault detection are automatically performed; and at the conclusion of the test, the operator need only to release the test button.

Figure 3:
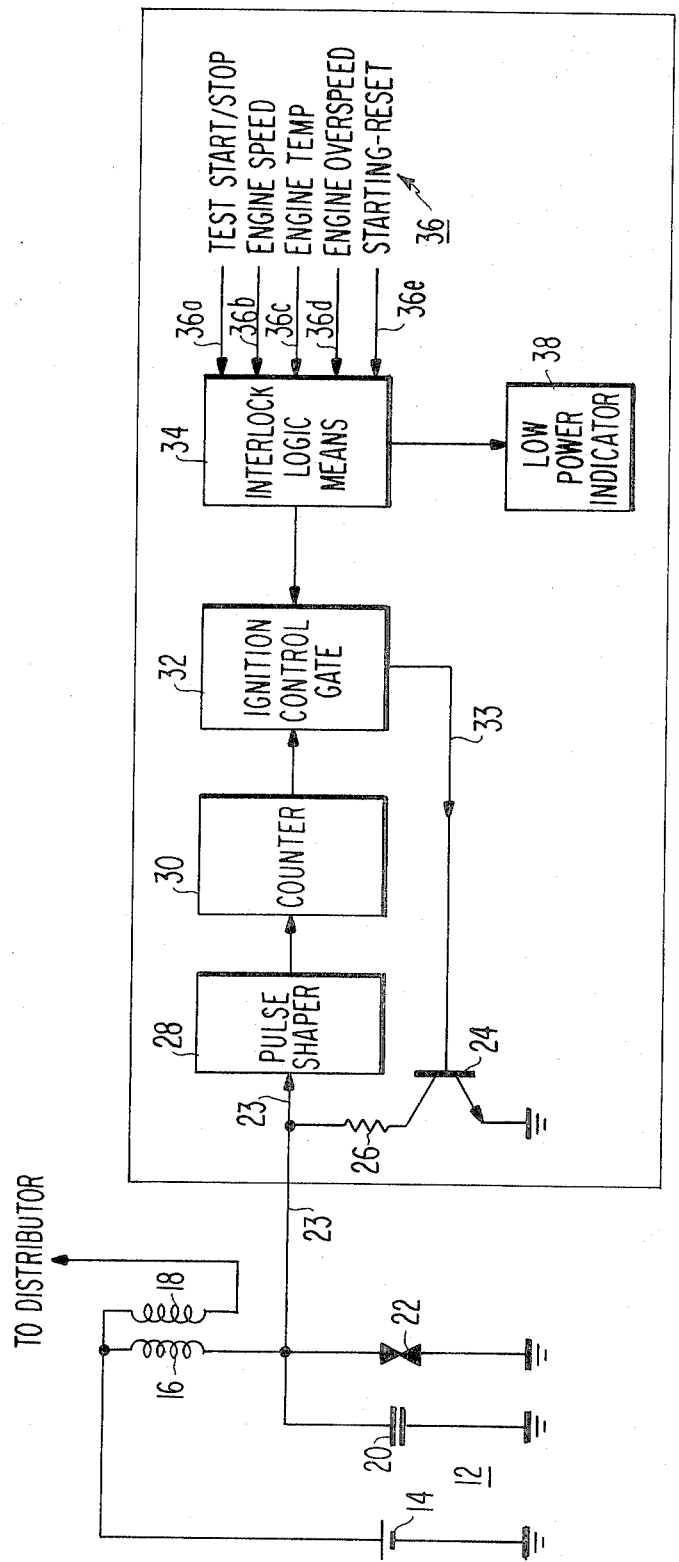
FIG. 3 is a block diagram of an engine performance analyzer in accordance with the present invention.

Referring now to FIG. 3, there is shown a block diagram of an engine performance analyzer in accordance with the present invention. The analyzer 10 is shown in conjunction with an ignition system 12 of an internal combustion engine. The ignition system 12 includes a battery 14, an ignition coil including a primary winding 16 and a secondary winding 18, a capacitor 20 and breaker points 22. The secondary winding 18 is connected at one end to the primary winding 16 and connected at its other end to the distributor (not shown) which in turn is connected to the engine spark plugs (not shown) in a conventional manner. Although performance analyzer 10 is shown in conjunction with a conventional engine and ignition system utilizing breaker points and an ignition coil, it will be appreciated by those skilled in the art that the present invention is applicable to other types of ignition systems such as an engine utilizing a capacitive-discharge or an electronic ignition system. Further, the present invention is equally applicable to other types of engines such as diesel (compression ignition) engines, by appropriately coupling to their fuel insertion or injection systems.

Analyzer 10 is externally coupled to ignition system 12 by way of lead 23. Lead 23 is internally coupled to a suitable ignition inhibiting device such as a shunt-shorting device. In FIG. 3 the ignition inhibiting device takes the form of an NPN transistor 24. The collector of transistor 24 is coupled to lead 23 by way of resistor 26. Lead 23 is also coupled to the input of a pulse shaper 28. The output of pulse shaper 28 is coupled to counter 30. The output of counter 30 is coupled to a first input of an ignition control gate 32. The output of gate 32 is coupled to transistor 24 by way of lead 33. Analyzer 10 includes interlock logic means 34 having a plurality of inputs 36 and a first output coupled to the second input of gates 32. A second output from logic means 34 is coupled to a low power indicator 38.

It can be seen that the emitter of transistor 24 is connected directly to ground, and its collector is connected to points 22 by way of a small value resistor 26. Accordingly, when a relatively positive potential is applied to the base of transistor 24, that transistor conducts heavily and thereby provides a shunt across breaker points 22. During the conduction period of transistor 24, even though the points open and close in synchronism with the engine and cylinder cycles, the magnetic field stored in primary winding 16 is prevented from collapsing. Thus, the ignition (cylinder firing) is inhibited during the time that a high potential is applied to the base of transistor 24.

The purpose of pulse shaper 28 is to detect the opening and closing of the breaker points 22. The small value resistor 26 permits pulse shaper 28 to detect the operation of the points even when the ignition (cylinder firing) is inhibited. The output signal from pulse shaper 28 provides a square wave pulse each time the points open and close. Accordingly, the output signal from pulse shaper 22 exhibits a leading edge which occurs coincident in time with the opening of the points and has a trailing edge coincident with the closing of the points and is thus synchronized with engine and cylinder cycles. Counter 30 provides an output signal each time a given number of ignition pulses, as provided by pulse shaper 28, is counted. The output of logic means 34 provides a signal to the second input of control gate 32 upon the occurrence of certain events as discussed more fully below. With an appropriate signal applied to both inputs of control gate 32, its output on lead 33 provides a signal to control the conductivity state of transistor 24.

Input 36a, labeled TEST START/STOP, provides a means for controlling the operation of analyzer 10. Input 36b, labeled ENGINE SPEED, provides an input related to the speed of the engine. Input 36c, labeled ENGINE TEMP, provides a signal indicative of the engine coolant temperature. Input 36d, labeled ENGINE OVERSPEED, provides an indication that the engine, while under test, has exceeded its maximum or "redline" speed. Finally, input 36e, lableed STARTING-RESET, is used to reset or clear the interlocked logic means 34 at the start of each starting period.

Still referring to FIG. 3, the general operation of analyzer 10 is described as follows. Analyzer 10 is coupled to the ignition system of the test engine by connecting lead 23 and an appropriate ground wire across breaker points 22. The engine is started by energizing its starter motor in the usual manner. A suitable signal, indicative of the starting sequence, is coupled to logic means 34 by way of input 36e to thereby disable the output of gate 32 to permit normal ignition firing. The engine performance test may commence by providing a suitable input signal on input 36a. At this point the operator may operate the engine at any desired, advanced throttle setting, including wide-open-throttle. Thereafter, once the engine speed exceeds the test or reference speed and the engine temperature is within the desired range (as indicated by the inputs on inputs 36b and 36c respectively), the engine ignition will continue to fire in an uninhibited fashion for a predetermined number of engine cycles to ensure that the reference speed has been sufficiently exceeded. After this predetermined normal ignition period, ignition control gate 32 will periodically inhibit the engine ignition for a predetermined cyclic pattern in accordance with the output of counter 30. As discussed above, it is desirable to operate the engine, during the test sequence, at advanced throttle settings as some engine faults can only be detected during advanced throttle operation. If, during the period of advanced or wide-open-throttle operation, the engine speed of the engine under test maintains or exceeds the test engine speed, the mechanic may stop the test by removing the input signal on input 36a.

An engine which delivers specified power, or a predetermined or acceptable fraction thereof, will operate in the inhibited mode at a speed above the predetermined reference speed. If, however, the engine fails to deliver such specified power, this condition will be indicated by low power indicator 38. Logic means 34 includes additional means to automatically conclude the test by stalling the engine, once the low power indication is provided by indicator 38. Finally, the engine will also automatically stall or shut-down if, during the test, the engine speed exceeds the maximum or "red-line" condition as indicated on input 36b. In any event, the test is automatically concluded by continuously inhibiting the ignition and thereby stalling the engine.

As previously discussed, it has been found that an effective engine performance analyzer, in accordance with the present invention requires careful consideration of the engine parameter dependencies and the role of the operator. For example, assume that the operator starts the test sequence by accelerating the engine up to the test speed range and then alters the normal ignition firing to a $1/n$ ratio (where $n > 1$). The operator must then immediately advance- or full-throttle the engine; nevertheless, the engine speed will tend to decrease below the predetermined test speed and then gradually accelerate to its steady-state resulting speed as the air-fuel ratio stabilizes. Thus, critical timing is required on the part of the operator to prevent stalling; and a time interval therefore exists during which engine speed measurements are essentially premature and dependent upon an operator's technique.

In the preferred embodiment of the present invention, this problem is eliminated and the operational instructions are significantly simplified by automatically controlling the starting and test evaluation sequence. Accordingly, in accordance with the present invention pushing a test button initiates this test sequence control and thereafter once the engine reaches some speed greater than the test speed limit, the control circuitry assumes that an advanced or full throttle condition already exists and then sets the remaining independent variable (that is, the firing ratio) to $1/n$. In this manner, the speed parameter has significant meaning for the full time period from test initialization (time at which firing ratio is changed) until test completion. This also simplifies the operator instructions for valid testing. The only basic instructions and operator actions required are:

1. Warm up engine
2. Push test button (switch)
3. Full-throttle accelerator
4. Release test button to end test if not previously ended automatically by test system.

Figure 4:
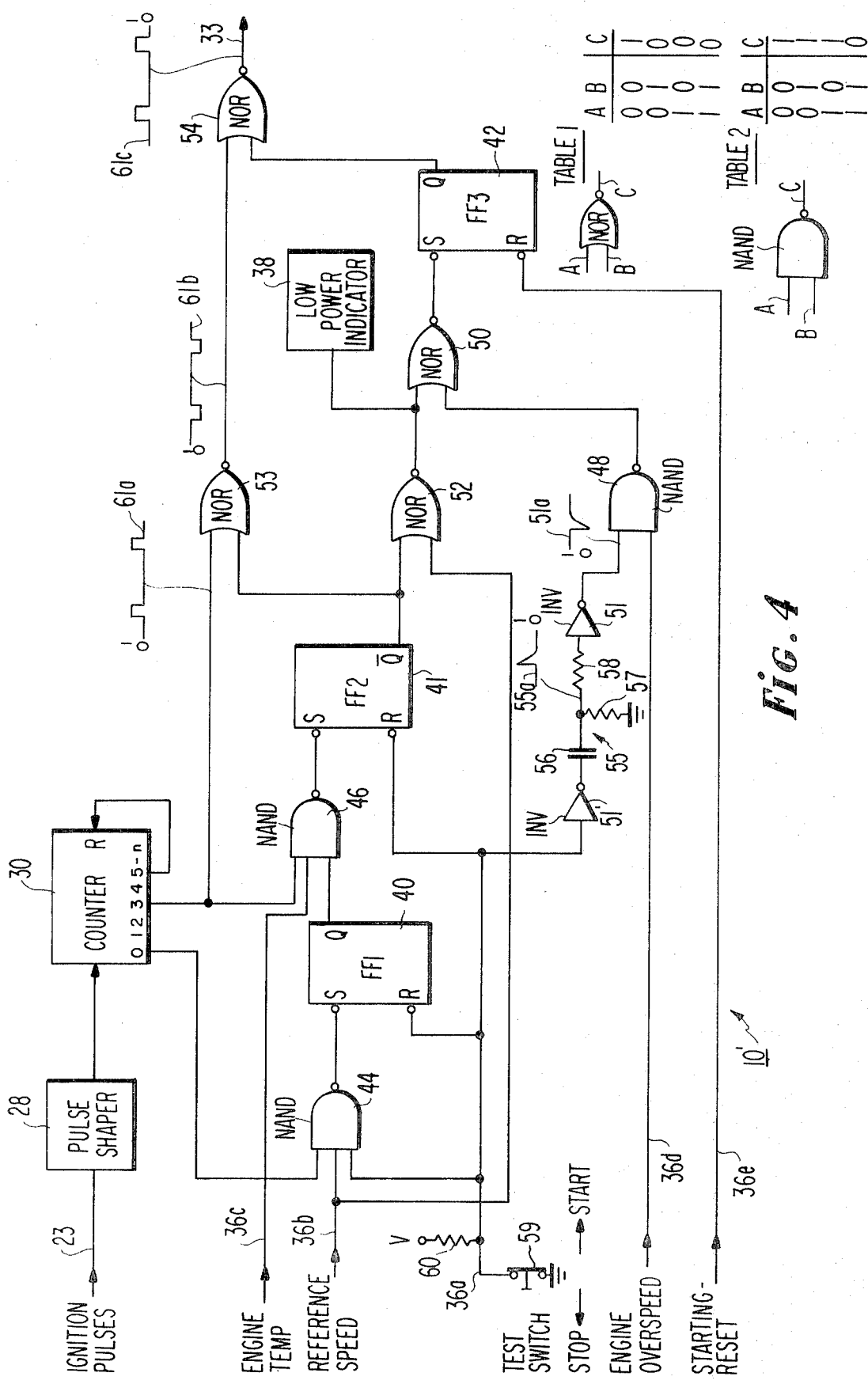
FIG. 4 is a logic diagram of a circuit configuration suitable for in the system of FIG. 3.

Referring now to FIG. 4, there is shown a logic diagram of a specific circuit configuration suitable for use in the system of FIG. 3. In FIGS. 3 and 4 like elements bear like reference numerals. An analyzer 10' of FIG. 4 includes three "set-reset" or RS flip-flops 40, 41 and 42. Each flip-flop includes a reset input R, a set input S and an output. The small circles, or NOT symbols, at the inputs of each flip-flop indicate that the logic level of an input signal applied to these inputs is accordingly inverted. A three-input NAND gate 44 has its output coupled to the set inputs of flip-flop 40. A first input of NAND gate 44 is coupled to an output (0) of counter 30; a second input is coupled to REFERENCE SPEED input 36b, and a third input is coupled to TEST SWITCH input 36a. A second three-input NAND gate 46 has its output coupled to the set input of flip-flop 41. A first input of NAND gate 46 is coupled to a second output (3) of counter 30; a second input is coupled to ENGINE TEMP input 36c; and a third input is coupled to a Q output of flip-flop 40. A two-input NAND gate 48 has its output coupled to one input of a NOR gate 50. A first input of NAND gate 48 is coupled to the output of inverter 51; and a second input is coupled to the ENGINE OVERSPEED input 36d.

A $\overline{Q}$ output from flip-flop 41 is coupled to a first input of a NOR gate 52, and to a first input of a NOR gate 53. The other input of NOR gate 52 is coupled to REFERENCE SPEED input 36b, and the other input of NOR gate 53 is coupled to the three-output of counter 30. The output of NOR gate 52 is coupled to the other input of NOR gate 50 and to low-power-indicator 38. The output of NOR gate 50 is coupled to the set inputs of flip-flop 42. A Q output of flip-flop 42 is coupled to a first input of a NOR gate 54. The output of NOR gate 53 is coupled to the other input of NOR gate 54. The output of NOR gate 54 is coupled to lead 33.

The STARTING-RESET input 36e is coupled to the reset input R of flip-flop 42. The TEST SWITCH input 36a is further coupled to the reset inputs of flip-flops 40 and 41; and input 36a is also coupled to the input of an inverter 51'. A differentiating network 56 comprising capacitor 56, resistor 57 and resistor 58, couples the output of inverter 51' to the input of inverter 51.

Input lead 36a is coupled to a point of reference potential, schematically represented as ground, by way of a switch 59. Input lead 36a is also coupled to a source of reference potential V by way of register 60. The reference potential V may be provided by the battery of the vehicle or by an independent source of potential such as a self-contained battery or any other suitable power source. It can be seen that when momentary switch 59 is in its normal or closed position, the potential on lead 36a is at ground. In the description of the logic circuitry of analyzer 10', which is to follow, ground potential will be taken to be a logic "0" and reference potential V will be taken to be a logic "1."

Before discussing the specific operation of analyzer 10' of FIG. 4, inputs 36b through 36e will be discussed. Input lead 36b is coupled to external means (not shown) for detecting the speed of the test engine and providing a logic "1" on lead 36b only when the test engine has achieved or exceeds the reference speed. As discussed above, the purpose of the input function on lead 36b is to ensure that the reference speed has been sufficiently exceeded before starting the interruption cycle. The external means coupled to lead 36b may comprise a conventional comparator which compares the engine speed to a predetermined reference; or any other suitable means such as a detector which detects the time duration between ignition pulses—wherein the time duration between pulses corresponds to the engine speed—, etc. Input lead 36c is coupled to external means (not shown) which detects the engine coolant temperature and provides a logic "1" on lead 36c when the engine temperature is in the desired operating region. Similarly, input 36d is coupled to external means (not shown) which provides a logic "0" on lead 36d when the engine, while under test, exceeds its maximum or "red-line" operating condition. Finally, input lead 36e is coupled to the starter-motor circuitry of the test engine so as to provide a logic "0" on lead 36e at the start of, or during, an engine starting sequence; and a logic "1" at all other times during the test sequence.

Lead 23 in FIG. 4 is coupled to the ignition system of the test vehicle in such a manner as to detect pulses which are synchronized to engine and cylinder cycles. For example, lead 23 of FIG. 4 may be coupled directly to the ignition system points as shown with respect to FIG. 3. Lead 33 of FIG. 4 is coupled to an ignition inhibiting device so as to inhibit ignition when a logic "0" appears on lead 33, and enable normal ignition when a logic "1" is present on lead 33. Counter 30 of FIG. 4 is preferably a counter which provides internal decoding and decimal outputs such as, for example, the RCA CD4017A integrated circuit package. In FIG. 4 the decimal outputs of counter 30 are designated as 0, 1, 2, 3, 4, 5 through $n$. It can be seen that the fifth or 5 output of counter 30 is coupled back to the reset input R of counter 30. Accordingly, counter 30 will reset itself after counting each group of five consecutive ignition pulses. It should now be apparent that if a selected one of the decimal outputs of counter 30 were coupled to the ignition control means of a performance analyzer in accordance with the present invention, a 20 percent IHP would result thereby. Further, other IHP percentage values can be obtained by appropriately coupling a different output of counter 30, which corresponds to the desired percentage of IHP, to its reset input.

Referring now to the operation of the logic circuit of FIG. 4, the logic sequence will be described in conjunction with a preferred test procedure. To facilitate an understanding of the operation of the logic gates, truth tables (Tables 1 and 2) are also shown in FIG. 4. During the time when the test engine is started, a logic "0" is applied to lead 36e which resets flip-flop 42 and therefore provides a logic "0" at the Q output of flip-flop 42. Since TEST SWITCH 59 is initially in its normally closed position, a logic "0" will appear on lead 36a. Accordingly, the $\overline{Q}$ output of flip-flop 41 will likewise initially provide a logic "1" corresponding to the reset state of flip-flop 41. Since the $\overline{Q}$ output of flip-flop 41 is coupled to one input of NOR gate 53, the output of gate 53 will exhibit a logic "0." At this time, since both inputs of NOR gate 54 are a logic "0," the output of gate 54 will be a logic "1" which therefore maintains normal or uninterrupted ignition.

At this time, the test may be started by depressing TEST SWITCH 59 which thereby provides a logic "1" on output lead 36a. Once the engine speed sufficiently exceeds the reference speed, a logic "1" will appear on lead 36b. Thereafter, when a logic "1" appears at the 0 output of counter 30, the output of NAND gate 44 will provide a logic "0" which sets flip-flop 40 causing its Q output to change state and apply a logic "1" to a first input of NAND gate 46. At the same time, if the engine temperature is within the desired range, a logic "1" will appear on input lead 36c. Accordingly, when the 3 output of counter 30 exhibits a logic "1" the output of NAND gate 46 will provide a logic "0" which sets flip-flop 41 causing its $\bar{Q}$ output to change state and therefore provide a logic "0." With a logic "0" thusly applied to one input of NOR gate 53, the output of gate 53 will provide a logic " 0" whenever a logic "1" appears at the numerical 3 output of counter 30. This sequence is illustrated by curves 61a and 61b.

Accordingly, it can be seen that once the engine has achieved the predetermined reference speed and the engine temperature is within the desired range, the ignition interrupt signal pattern is provided on output lead 33 as illustrated by curve 61c. It should also be appreciated that by virtue of cooperation of flip-flops 40 and 41 and the associated circuitry, three additional uninterrupted cylinder firings are provided. This feature is provided in order to raise the engine speed sufficiently above the test limit to prevent an otherwise acceptable engine from falling below the reference speed when the ignition interrupt operation is first started.

The purpose of flip-flop 42 is to provide means for automatically concluding the test in the event: (i) the test has been deliberately concluded by the operator as manifested by releasing TEST SWITCH 59; (ii) low power has been indicated; or (iii) the engine has exceeded its maximum or "red-line" speed.

The purpose of inverters 51 and 51', and differentiating network 55 is to provide an end of test signal. At the conclusion of the test, after the operator has released switch 59, a logic "0" appears at the input of inverter 51'. Accordingly, the output of inverter 51' provides a logic "1" as soon as switch 59 is released. The positive leading edge of this logic "1" is differentiated by differentiating network 55 to provide a momentary logic "1" at the input of inverter 51. This momentary logic "1" is illustrated by curve 55a. Accordingly, the output of inverter 51 will likewise exhibit a momentary logic "0" as illustrated by curve 51a. This momentary logic "0" at the input of NAND gate 48 causes the output of gate 48 to manifest a momentary logic "1." The momentary logic "1" at the output of NAND gate 48 causes the output of NOR gate 50 to likewise manifest a momentary logic "0." The momentary logic "0" at the set or S input of flip-flop 42 causes its Q output to change state and "latch" into a logic "1" state. Thereafter the logic "1" at the output of flip-flop 42 causes the output of NOR gate 54 to manifest a logic "0" which causes the engine to stall or shut down.

Similarly, if during the engine test procedure the engine overspeeds, a logic "0" will appear on input lead 36d. This logic "0" at the corresponding input of NAND gate 48 likewise causes flip-flop 42 to change state and latch to thereby stall the engine under test.

If during the above-described test sequence the engine under test fails to maintain a steady-state speed above the reference speed, the test is automatically concluded and an indication of low power is provided by indicator 38. As previously discussed, the Q output of flip-flop 41 changes state to a logic "0" after the test engine has achieved the reference test speed and three additional cylinder firings have occurred. Accordingly, after flip-flop 41 changes state, the corresponding input of NOR gate 52 is a logic "0" whereas the input coupled to lead 36b is necessarily a logic "1." Under these conditions the output of NOR gate 52 will be a logic "0." However, if during the test sequence the engine speed falls below the reference speed, a logic "0" will appear on lead 36b. Under these conditions a logic "1" will appear at the output of NOR gate 52 which activates low power indicator 38. The logic "1" at the output of NOR gate 52, under these conditions, also causes the output of NOR gate 50 to manifest a logic "0" which sets flip-flop 42. As discussed above, once flip-flop 42 is set, the test is automatically concluded by stalling the engine. Low power indicator 38 may include suitable memory circuitry to store the low power indication until indicator 38 is reset.

It is noted that counter 30 in analyzer 10' of FIG. 4 provides a one-out-of-five or 20 percent ignition-on to ignition-off interrupt cycle. In a four cylinder engine, such as that depicted by FIGS. 1 and 2, this 20 percent inhibit cycle provides one cylinder firing out of every sequence of five ignition cycles. One of the advantages of firing one cylinder out of every five is that each cylinder in the engine is fired during the ignition interrupt test. Stated differently, if the firing ratio was one cylinder out of every four (in a four cylinder engine), then the engine would always fire on the same cylinder at which the interrupt pattern started. Accordingly, this would result in an individual cylinder test rather than an overall engine test. However, it should be understood that there may be engine performance analyzer applications where such a single cylinder test is nevertheless desirable. In any event, an overall engine test can be accomplished (and the single cylinder test accordingly avoided) by firing one cylinder during an odd number of ignition cycles—assuming an engine with an even number of cylinders.

Figure 5:
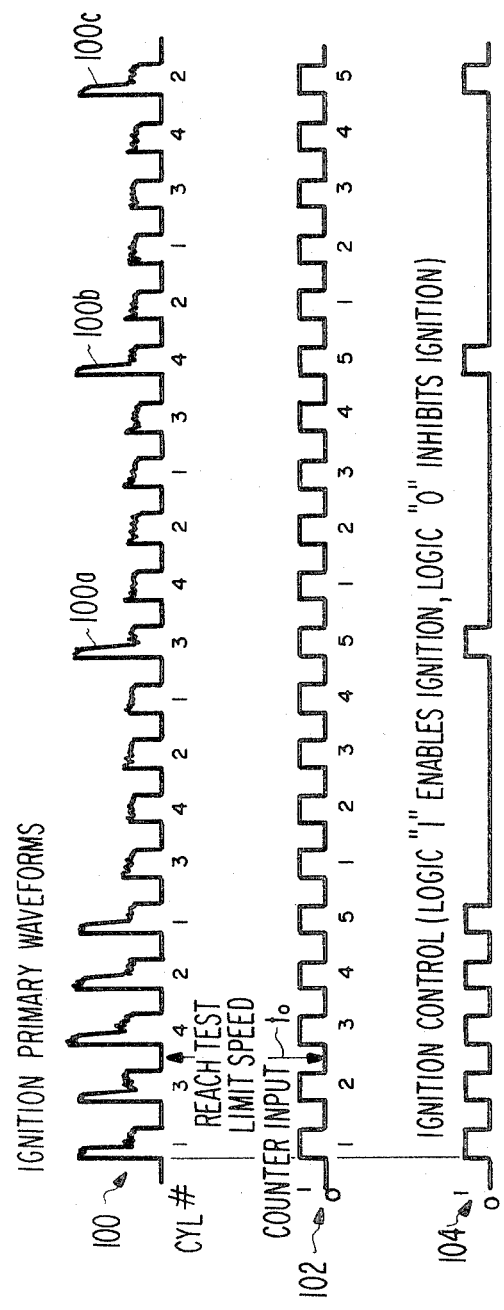
FIG. 5 is a graph of the ignition and control logic waveforms indicative of the operation of the system in accordance with FIGS. 3 and 4.

Referring now to FIG. 5 there is shown a graph of the ignition and control logic waveforms indicative of the operation of the system in accordance with FIGS. 3 and 4. Curve 100 of FIG. 5 shows a simulation of the ignition coil primary waveforms. Curve 102 shows the shaped input pulses as applied to counter 30 in FIGS. 3 and 4. Curve 104 shows the control output signal which appears on lead 33 in FIGS. 3 and 4. In this hypothetical representation, it is assumed that the mechanic or operator has started the test prior to the portion of the waveforms shown in FIG. 5. The ignition primary waveform is shown with arbitrary cylinder numbering corresponding to the firing order for the four-cylinder engine. At time $t_0$, the time between the second and third counter input pulses, the engine has reached the reference speed. It can be seen that normal ignition continues for three additional ignition pulses. Thereafter the ignition is interrupted on a 20 percent duty cycle. It can also be seen, by reference to primary waveforms 100a, 100b and 100c, that a different cylinder is fired during each ignition enable period.

To summarize the preferred operation of the engine performance analyzer, in accordance with the present invention, the position of the throttle is fixed at full throttle or some other known position. The available output power is reduced to a fixed value equal to zero (i.e., BHP = 0) by introducing an ignition interrupt technique having a constant ignition firing ratio of less than unity (1). The constant ignition ratio is established by firing 1 out of $n$ cylinders to provide a fixed IHP' equal to (Normal IHP/$n$). Accordingly, with the engine being operated under full throttle (or a known given value), with a fixed ignition firing ratio of $1/n$ and with a constant available output power equal to zero, there is only one independent variable (engine condition) and one dependent variable (engine speed) remaining. Thus, engine speed is solely dependent upon the engine condition, and a comparison of this speed to predetermined test speed limits can be utilized as an effective criterion for evaluating the overall performance of an internal combustion engine.

What has been taught then is an effective, operator/mechanic-oriented engine performance analyzer. It will be appreciated that the performance analyzer can be provided in integrated circuit form to further facilitate its use as a diagnostic tool. Finally, it will be appreciated that an engine performance analyzer, in accordance with the present invention, provides a means for testing the overall performance of an internal combustion engine which was previously obtainable only through the use of external loading such a dynamometer.

What is claimed is:

1. An engine performance analyzer for use with an internal combustion engine, said engine having a throttle which normally controls the speed of said engine between minimum and maximum speed values in accordance with throttle settings, said engine having an ignition system which normally provides cylinder ignition at a rate related to the speed of said engine, said analyzer comprising:

first means for detecting pulses synchronized with the engine and cylinder cycles of said engine;

second means for counting said detected pulses and for providing a first output signal each time a given number of pulses have been counted, each of said first output signals having a duration related to said speed of said engine;

third means for detecting the speed of said engine and for providing a second output signal when the speed of said engine exceeds a predetermined reference speed;

interlock logic means having a first mode of operation and being actuable to second and third modes of operation, said logic means being coupled to said second means and said third means, said logic means providing in said first mode a third output signal, said logic means providing in said second mode either said third output signal or a fourth output signal and said logic means providing in said third mode solely said fourth output signal, said logic means being actuated to said second mode in response to said second output signal whereupon said logic means provides said fourth output signal except during each of said first output signals, and said logic means being actuated to said third mode if said third means ceases to provide said second output signal;

means coupled between said ignition system and said logic means for inhibiting the occurrence of cylinder ignition in response to said fourth output signal and for providing normal cylinder ignition in response to said third output signal; and indicating means coupled to said logic means for providing an indication if said third means ceases to provide said second output signal.

2. The analyzer according to claim 1, wherein said logic means includes means to actuate said logic means to said third mode if said detected engine speed exceeds a predetermined maximum engine speed.

3. The analyzer according to claim 2, including means to detect the temperature of said engine to provide a fifth output signal when said engine temperature exceeds a predetermined temperature; and wherein said logic means includes means responsive to said fifth output signal to inhibit said logic means from being actuated to said second mode until said engine temperature exceeds said predetermined temperature.

4. The analyzer according to claim 1, wherein said logic means includes means to delay the actuation of said logic means to said second mode for a predetermined number of detected pulses after said third means initially provides said second output signal.

5. The analyzer according to claim 1, wherein said logic means further includes means for resetting said logic means to said first mode of operation in response to an external signal indicative of an engine starting sequence.

6. The analyzer according to claim 1, wherein said engine includes an even number of cylinders and said given number of pulses is an odd number whereby said third output signal provides normal cylinder ignition of a different engine cylinder each time said second means provides said first output signal.

* * * * *